US005402534A

United States Patent [19]

Yeomans

[11] Patent Number: 5,402,534

[45] Date of Patent: Mar. 28, 1995

[54] VIGNETTE COLOR COMPONENT VALUE GENERATION METHOD AND APPARATUS

[75] Inventor: Andrew J. V. Yeomans, Herts, England

[73] Assignee: Crosfield Electronics Limited, Herts, England

[21] Appl. No.: 694,171

[22] Filed: May 1, 1991

[30] Foreign Application Priority Data

May 1, 1990 [GB] United Kingdom ................. 9009722

[51] Int. Cl.$^6$ ......................... G09G 1/06; H04N 1/415

[52] U.S. Cl. ...................................... 395/131; 358/530

[58] Field of Search ........................ 395/131, 161, 154; 345/147, 150; 358/521, 523, 530; 348/189

[56] References Cited

U.S. PATENT DOCUMENTS

| | | | |
|---|---|---|---|
| 4,897,806 | 1/1990 | Cook et al. | 395/131 X |
| 4,901,265 | 2/1990 | Kerr et al. | 364/721 X |
| 4,930,010 | 5/1990 | MacDonald | 358/530 X |
| 4,958,272 | 9/1990 | Wake | 395/131 X |
| 4,965,754 | 10/1990 | Stansfield et al. | 395/131 X |
| 4,992,780 | 2/1991 | Penna et al. | 395/131 |
| 5,018,085 | 5/1991 | Smith, Jr. | 395/131 X |
| 5,051,928 | 9/1991 | Gruters | 395/131 |
| 5,058,040 | 10/1991 | Tajima | 395/131 |
| 5,067,098 | 11/1991 | Moellering et al. | 395/131 X |
| 5,105,469 | 4/1992 | MacDonald et al. | 395/131 X |
| 5,218,671 | 6/1993 | Liao et al. | 395/131 |
| 5,228,120 | 7/1993 | Farr et al. | 395/131 |
| 5,317,678 | 5/1994 | Okawara et al. | 395/131 X |

FOREIGN PATENT DOCUMENTS 324271 7/1989 European Pat. Off. .

OTHER PUBLICATIONS

Patent Abstracts of Japan, vol. 11, No. 354, Nov. 19, 1987, Takenosuke Harada, No. 62-131378.

*Primary Examiner*—Heather R. Herndon
*Assistant Examiner*—Cliff N. Vo
*Attorney, Agent, or Firm*—Sughrue, Mion, Zinn, Macpeak & Seas

[57] ABSTRACT

A method of generating color component values of a vignette, the values being permitted to lie between upper and lower limits comprises generating a nominal vignette value; and modifying the nominal vignette value by a randomly chosen amount, the randomly chosen amount lying within a predetermined range. The predetermined range within which the random amount may lie narrows in accordance with the nearness of the nominal vignette value to the upper and lower limits.

5 Claims, 3 Drawing Sheets

VIGNETTE COLOR COMPONENT VALUE GENERATION METHOD AND APPARATUS

FIELD OF THE INVENTION

The invention relates to a method and apparatus for generating colour component values of a vignette.

DESCRIPTION OF THE PRIOR ART

In the field of graphic image processing a feature which is often required is a vignette. In theory, a vignette (also known as a gradation, degrade or colour fountain) comprises a continuous gradation in colour between upper and lower density levels. In practice, the variation of the vignette is quantized into a number of discrete steps. Unfortunately, with highly sophisticated graphics display systems, even if the quantization steps are relatively small, it is still possible to see the stepped nature of a displayed image containing a vignette. To reduce this, it has been the practice to introduce a random noise variation so as to even out the stepped appearance in which step values within a range on either side of a nominal step value are chosen at random.

The difficulty with this approach occurs when the nominal vignette value is close to the upper and lower limits. In these circumstances, the random variation can produce a vignette value which is outside the specified range usually indicating that it is outside the display gamut. In this situation, the calculated vignette value is replaced by the adjacent upper or lower limit value respectively. This then results in an undesirable band appearing on the display. If this vignette is placed abutting to a non-graduated tint area, there will be an undesirable discontinuity in colour between the vignette and the tint area.

SUMMARY OF THE INVENTION

In accordance with a first aspect of the present invention, a method of generating colour component values of a vignette, the values being permitted to lie between upper and lower limits comprises generating a nominal vignette value; and modifying the nominal vignette value by a randomly chosen amount, the randomly chosen amount lying within a predetermined range characterized in that the predetermined range within which the random amount may lie narrows in accordance with the nearness of the nominal vignette value to the upper and lower limits.

In accordance with a second aspect of the present invention, apparatus for generating colour component values for the vignette, the values being permitted to lie between upper and lower limits comprises a nominal vignette value generator; a random number generator for generating a random number varying within a predetermined range; and combining means coupled to the nominal vignette value generator and the random number generator to modify the value generated by the nominal vignette value generator in accordance with the random number; characterized in that the random number generator includes means for causing the predetermined range within which the random number may lie to narrow in accordance with the nearness of the nominal vignette value generated by the nominal vignette value generator to the upper and lower limits.

We have devised a modified method and apparatus for generating vignette values in which the random number or noise which is imposed on the nominal value is limited to fall within a narrower range as the nominal value approaches the upper and lower limits. This leads to a much more gradual approach of the output vignette values to the upper and lower limits and avoids the problem of large bands occurring or discontinuities in colour with adjacent tint areas.

The values may be digital or analog.

Preferably, the method comprises comparing the nominal vignette value with the upper and lower limits, and, if the nominal vignette value lies within a predetermined distance from either of the limits selecting an appropriate range within which the random amount may lie. For example, the range may be defined to be symmetrical about the nominal vignette value and to have an extreme corresponding to the nearer of the upper and lower limits.

The apparatus therefore preferably comprises comparison means for comparing the nominal vignette value generated by the nominal vignette value generator with he upper and lower limits, and, if the nominal vignette value lies within a predetermined distance from either of the limits, for controlling the random number generator so that the random number can vary within a range which is symmetrical about the nominal vignette value and which has an extreme coinciding with the nearer of the upper and lower limits.

The reference to a random amount or random number should be taken to include a pseudo random amount or number.

The apparatus may be implemented on a suitably programmed computer or using hard wired circuits or a combination of the two.

BRIEF DESCRIPTION OF THE DRAWINGS

Two examples of methods and apparatus according to he invention will now be described with reference to the accompanying drawings, in which.

DETAILED DESCRIPTION OF THE EMBODIMENTS

Figure 1:
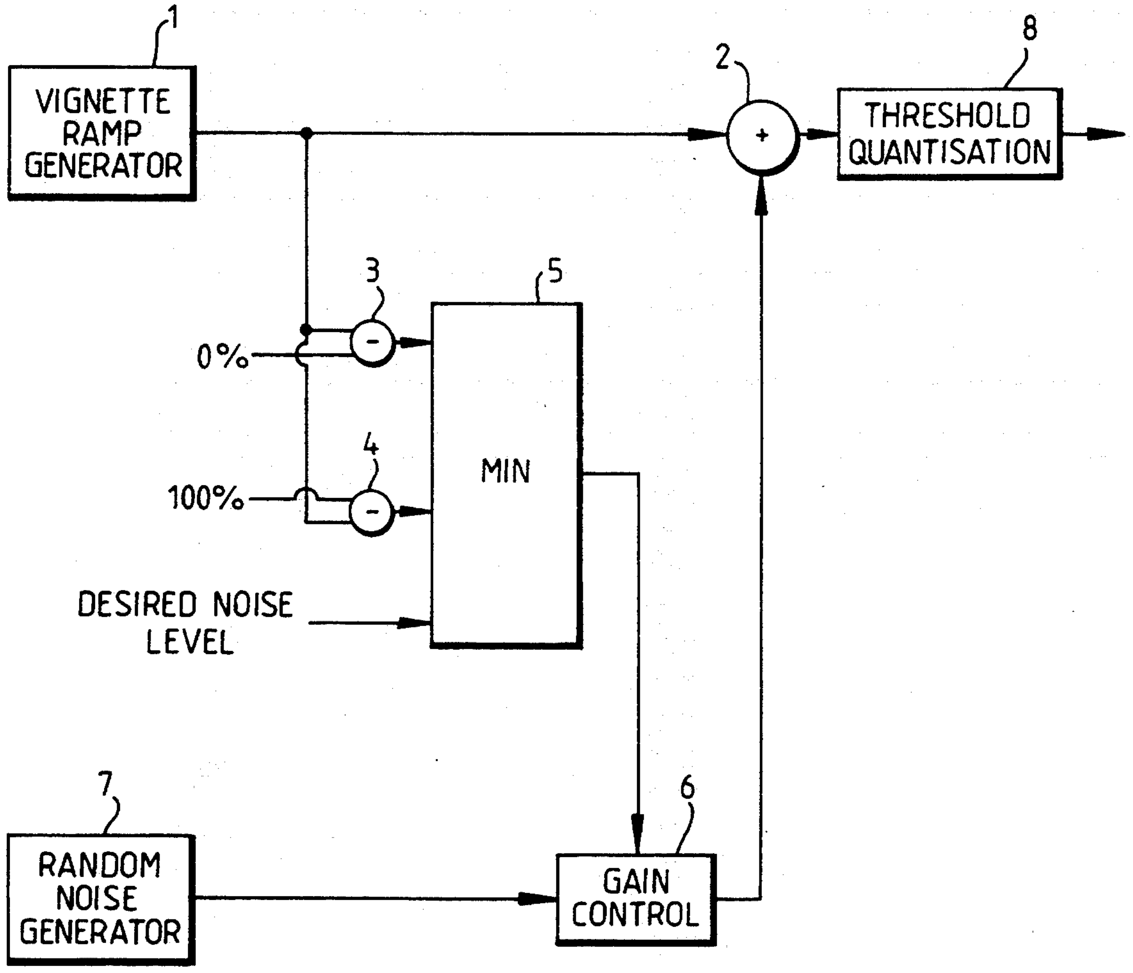
FIG. 1 is a block diagram of a first example of the apparatus.

The apparatus shown in FIG. 1 comprises a vignette ramp generator 1 which generates a set of nominal values corresponding to vignette colour density values ranging between 0% and 100%. The nominal values are fed to an adder circuit 2 and also to a pair of subtractor circuits 4. The other input of the subtractor circuit 3 receives a signal representing 0% colour density while the other input of the subtractor circuit 4 receives a signal representing 100% colour density. The outputs of the two subtractor circuits 3, 4 are fed to a minimum determining circuit 5 to which is also fed a desired noise level signal. The output from the circuit 5 will be the smallest of the 3 input values and this is fed to gain control circuit 6 of a random number generator. The random number generator also includes a random noise generator circuit 7 which generates values in the range $-1$ to $+1$. The output of the gain control circuit 6 is fed to the adder circuit 2 which adds the random noise variation to the nominal vignette value, the output from the adder circuit 2 being fed to a threshold quantization circuit 8 which converts the signal to an allowable quantized output value.

Typically there will be several hundred quantization steps over the allowable range of output values. If the circuit is built with digital elements, the values produced by the vignette ramp generator 1 and random noise generator 7 must be held to a greater precision than the output values, for example subdividing each output quantization step into 8 smaller steps.

If the circuit is built with analogue elements, with voltage representing the values, the circuit elements must maintain an accuracy corresponding to an error substantially smaller than a single output quantization step.

Prior to operation, a desired noise level has to be determined and typically this may be 10 output quantization steps. In other words, the signal output from the gain control circuit 6 can have values of between ±10 quantization steps. Thus, during the generation of nominal vignette values towards the centre of the range between 0% and 100%, the output from the circuit 5 will cause the gain control circuit 6 to modify the random numbers from the generator 7 to take up values in the range ±10 quantization steps which is then added to the nominal value.

At the beginning of a ramp generation, which will start at 0% colour density, the subtractor 3 will produce a value (corresponding to the colour density value) which will be represented by less than 10 quantization steps. Consequently, the circuit 5 will output that value instead of the normal desired noise level value of 10 quantization steps. This will cause the gain control circuit 6 to prevent the resultant random amount fed to the adder 2 from varying within its normal range and will restrict that range to the number of quantization steps corresponding to the signal input from the subtractor 3.

In a similar manner, as the ramp approaches 100% colour density, the signal from the subtractor 4 will become less that the desired noise level signal and again the gain control circuit 6 will reduce the range within which the random number fed to the adder 2 can vary to be equal to ± the number of quantization steps corresponding to the output from the subtractor 4.

In this way, a smooth approach to the extremes of the ramp is achieved.

Figure 2:
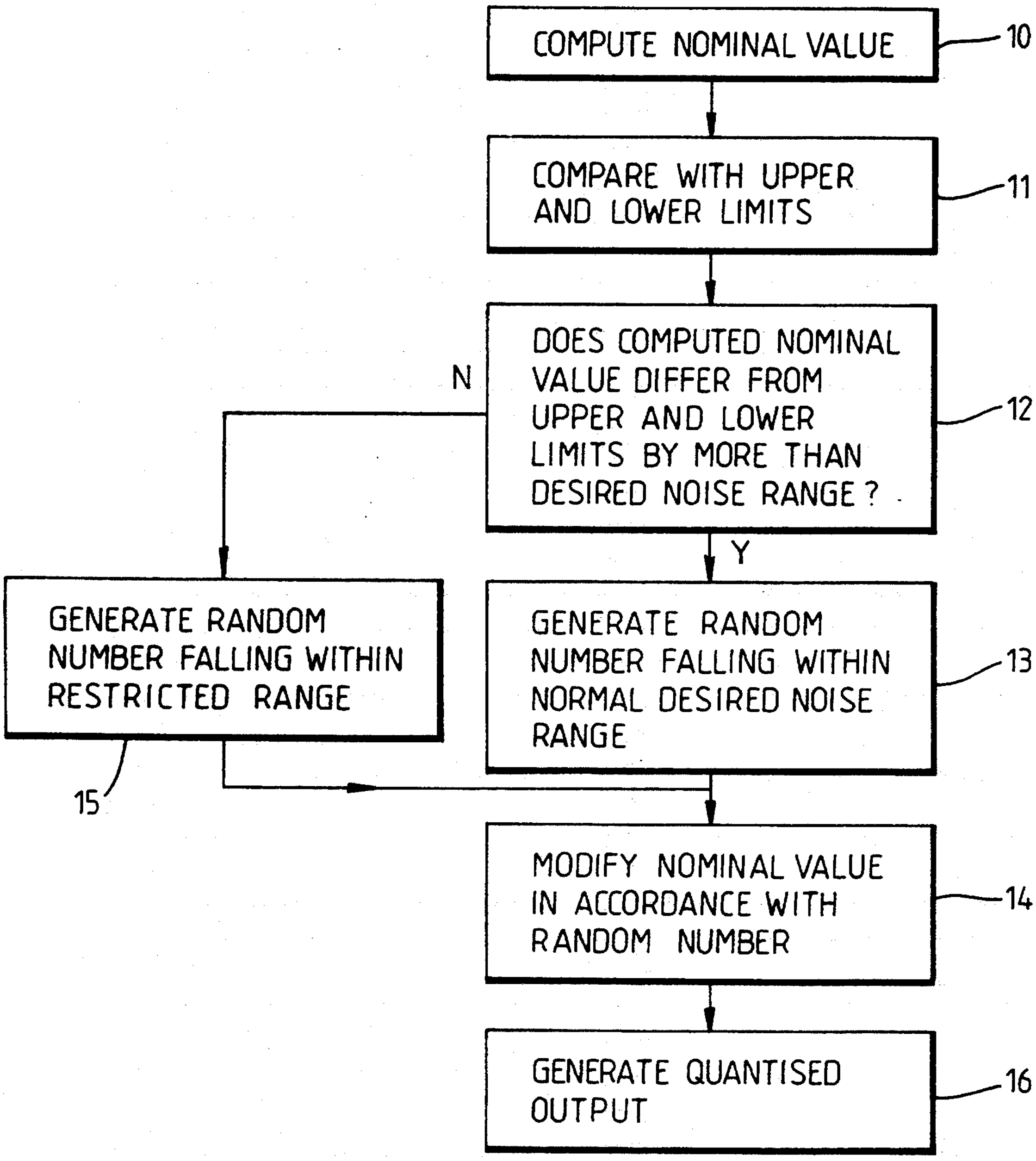
FIG. 2 is a flow diagram illustrating operation of software based apparatus.

FIG. 2 is a flow diagram illustrating operation of computer based system. The computer receives nominal vignette values from a vignette ramp generator (not shown) in a step 10 and compares that nominal value with the upper and lower limits within which the nominal value can vary to determine the number of quantization steps defined between the read nominal value and the upper and lower limits respectively. (step 11).

If the distance, in terms of quantization steps, between the read nominal value and the upper and lower limits exceeds a predetermined, desired noise level then the nominal value is modified by a random number varying within the desired noise level range. (steps 12–14).

If the difference in terms of number of quantization steps is less than the desired noise range then a random number is generated which falls within this restricted range (step 15).

Finally, the modified nominal value is quantized by truncation or rounding to the nearest quantized output value (step 16).

Figure 3:
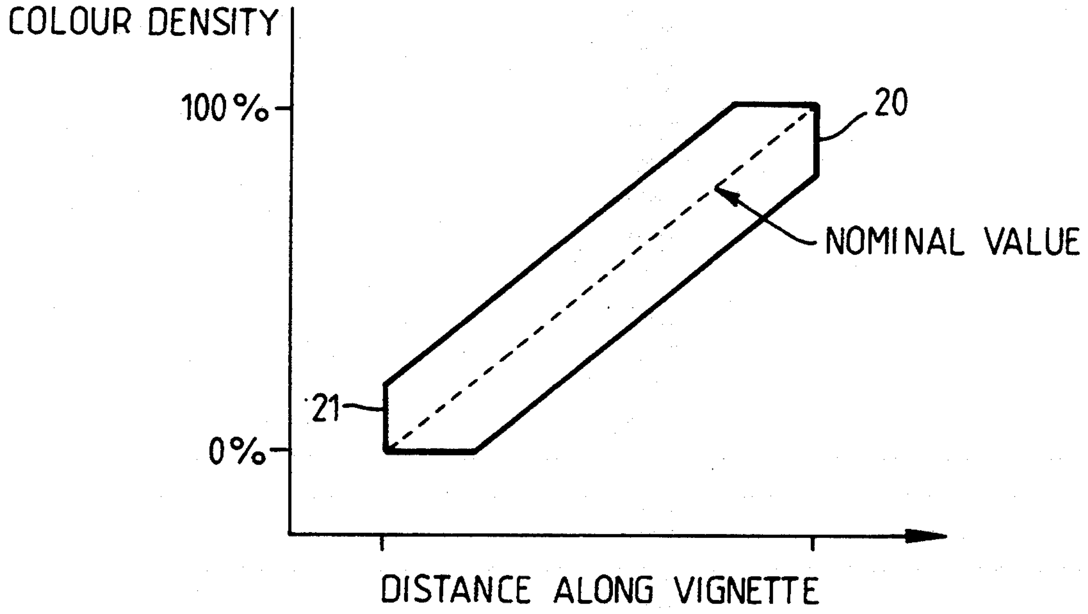
FIG. 3 illustrates the variation in a conventionally produced vignette; and, FIG. 4 illustrates the variation in a vignette generated by the FIG. 1 apparatus.
Figure 4:
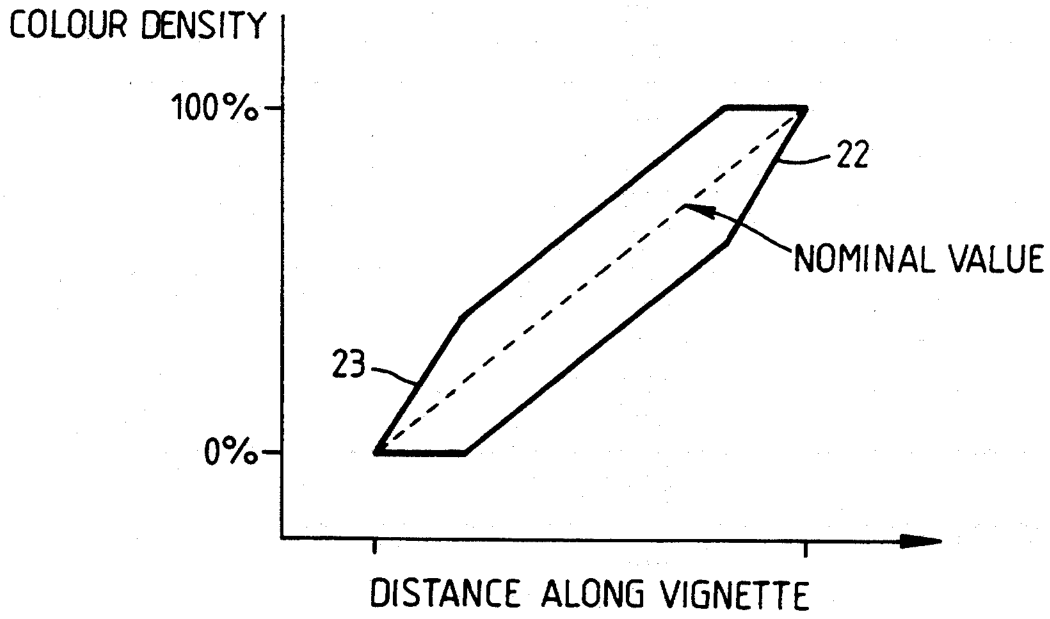

FIG. 3 illustrates graphically the form of a conventional vignette where it will be seen that close to the upper and lower nominal density values, hard edges 20, 21 are produced. In contrast, FIG. 4 illustrates an example of a vignette produced using the FIG. 1 apparatus where it will be seen that as the nominal values approach their extremes, much softer edges 22, 23 are generated.

Typically, the apparatus shown in FIG. 1 will be used, in the case of a multi-colour image, for one colour component of that image. However, in such a multi-colour image, some circuit elements may be shared, for example a single random number generator may be used for all colour components.

I claim:

1. A method of generating colour component values of a vignette, the colour component values being permitted to lie between upper and lower limits, the method comprising generating a nominal vignette value; and modifying said nominal vignette value by a randomly chosen amount, said randomly chosen amount lying within a predetermined range, wherein said predetermined range within which said randomly chosen amount may lie narrows in accordance with the nearness of said nominal vignette value to said upper and lower limits.

2. A method according to claim 1, comprising comparing said nominal vignette value with said upper and lower limits, and, if said nominal vignette value lies within a predetermined distance from either of said limits, selecting an appropriate range within which the said randomly chosen amount may lie.

3. A method according to claim 2, wherein said appropriate range is defined to be symmetrical about said nominal vignette value and to have an extreme corresponding to the nearer of said upper and lower limits.

4. Apparatus for generating colour component values for a vignette, the colour component values being permitted to lie between upper and lower limits, the apparatus comprising a nominal vignette value generator; a random number generator for generating a random number varying within a predetermined range; and combining means coupled to said nominal vignette value generator and said random number generator to modify the value generated by said nominal vignette value generator in accordance with the random number; wherein said random number generator includes means for causing the predetermined range within which the random number may lie to narrow in accordance with the nearness of said nominal vignette value generated by said nominal vignette value generator to the upper and lower limits.

5. Apparatus according to claim 4, further comprising comparison means for comparing the nominal vignette value generated by said nominal vignette value generator with the upper and lower limits, and, if the nominal vignette value lies within a predetermined distance from either of the limits, for controlling said random number generator so that the random number can vary within a range which is symmetrical about the nominal vignette value and which has an extreme coinciding with the nearer of the upper and lower limits.

* * * * *